United States Patent
Stonehouse et al.

(10) Patent No.: US 8,736,276 B2
(45) Date of Patent: May 27, 2014

(54) RIPPLE SPRING AND DIAGNOSTIC METHOD THEREFOR

(75) Inventors: Thomas Robert Stonehouse, Clifton Park, NY (US); Elena Rozier, Schenectady, NY (US); James Jun Xu, Niskayuna, NY (US); Lawrence Lee Sowers, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 534 days.

(21) Appl. No.: 13/163,782

(22) Filed: Jun. 20, 2011

(65) Prior Publication Data

US 2012/0319698 A1 Dec. 20, 2012

(51) Int. Cl.
*G01R 31/06* (2006.01)
*H02K 3/48* (2006.01)

(52) U.S. Cl.
USPC ............ 324/537; 324/545; 310/214; 310/215

(58) Field of Classification Search
CPC ..... H02K 3/487; H02K 15/00; G01R 31/025; G01R 31/346; G01R 31/1227; G01N 2203/0288
See application file for complete search history.

(56) References Cited

U.S. PATENT DOCUMENTS

| | | |
|---|---|---|
| 3,909,931 A | 10/1975 | Lambrecht |
| 3,949,255 A | 4/1976 | Brown et al. |
| 4,055,826 A | 10/1977 | Franz |
| 4,387,316 A | 6/1983 | Katsekas |
| 4,468,504 A | 8/1984 | Kuemmel |
| 4,584,497 A | 4/1986 | Butman, Jr. et al. |
| 5,325,008 A | 6/1994 | Grant |
| 7,112,909 B2 | 9/2006 | Swartout et al. |
| 7,852,105 B2 | 12/2010 | Seeley et al. |
| 8,400,042 B2 * | 3/2013 | Xu et al. ................. 310/214 |
| 8,520,986 B2 * | 8/2013 | Dailey ..................... 385/12 |
| 2005/0284241 A1 | 12/2005 | Swartout et al. |
| 2008/0036336 A1 | 2/2008 | Salem et al. |
| 2008/0143209 A1 * | 6/2008 | Tan et al. ................. 310/196 |
| 2009/0245717 A1 | 10/2009 | Iversen et al. |

FOREIGN PATENT DOCUMENTS

| | | |
|---|---|---|
| EP | 1408599 A2 | 4/2004 |
| EP | 2 194 388 A2 | 6/2010 |
| JP | 59136039 | 8/1984 |
| JP | 2009161627 A | 7/2009 |

OTHER PUBLICATIONS

Search Report issued in connection with GB Application No. 1210612.6, Sep. 24, 2012.

* cited by examiner

*Primary Examiner* — Minh N Tang
(74) *Attorney, Agent, or Firm* — James W. Pemrick; Ernest G. Cusick; Frank A. Landgraff

(57) ABSTRACT

A ripple spring is provided having one or more conductive layers, and one or more non-conductive layers. The conductive layers and the non-conductive layers are laminated together to form a symmetrical stack of layers. A method is also provided for monitoring the ripple spring. The method includes the steps of providing a ripple spring that holds a winding in place, where the ripple spring is positioned at least partially within a stator slot defined within an electromechanical device. Providing a conductive layer disposed within the ripple spring, and generating signals from the conductive layer, the signals corresponding to at least one aspect of the ripple spring. An analyzing step analyzes the signals to determine the at least one aspect of the ripple spring, wherein the at least one aspect facilitates an identification of faults in the ripple spring.

15 Claims, 10 Drawing Sheets

US 8,736,276 B2

RIPPLE SPRING AND DIAGNOSTIC METHOD THEREFOR

BACKGROUND OF THE INVENTION

The invention relates generally to electrical machines and in particular, to a ripple spring used in an electrical machine.

Armature windings, also known as stator bar windings, are routinely inspected in electrical power generators, to verify their operation. In some generators, a stator yoke in the generator surrounds an armature core and partially encloses the armature windings. The stator windings are formed from a plurality of copper conductors that are wound in the armature to form loops. The armature windings may be arranged within a stator slot in such a manner that the generator may maintain desired voltage and current characteristics during operation.

Typically, a generator includes a wedge system with ripple springs, to induce a radial or circumferential retaining force to the stator from wedges or ripple springs to facilitate reducing movement of the stator bar windings within the stator slot. However, if the wedge system itself becomes loose or the ripple springs malfunction (e.g., crack), the amount of retaining force is reduced such that the stator bar windings may vibrate during operation. Over time, the relative motion of the stator bar windings cause damage to the insulation surrounding the stator bars and a potential stator bar winding failure may be caused through electrical shorts to ground.

BRIEF DESCRIPTION OF THE INVENTION

In an aspect of the present invention, a ripple spring is provided having one or more conductive layers, and one or more non-conductive layers. The conductive layers and the non-conductive layers are laminated together to form a symmetrical stack of layers.

In another aspect of the present invention, A method is provided for monitoring a ripple spring. The method includes the steps of providing a ripple spring that holds a winding in place, where the ripple spring is positioned at least partially within a stator slot defined within an electromechanical device. Providing a conductive layer disposed within the ripple spring, and generating signals from the conductive layer, the signals corresponding to at least one aspect of the ripple spring. An analyzing step analyses the signals to determine the at least one aspect of the ripple spring, wherein the at least one aspect facilitates an identification of faults in the ripple spring.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
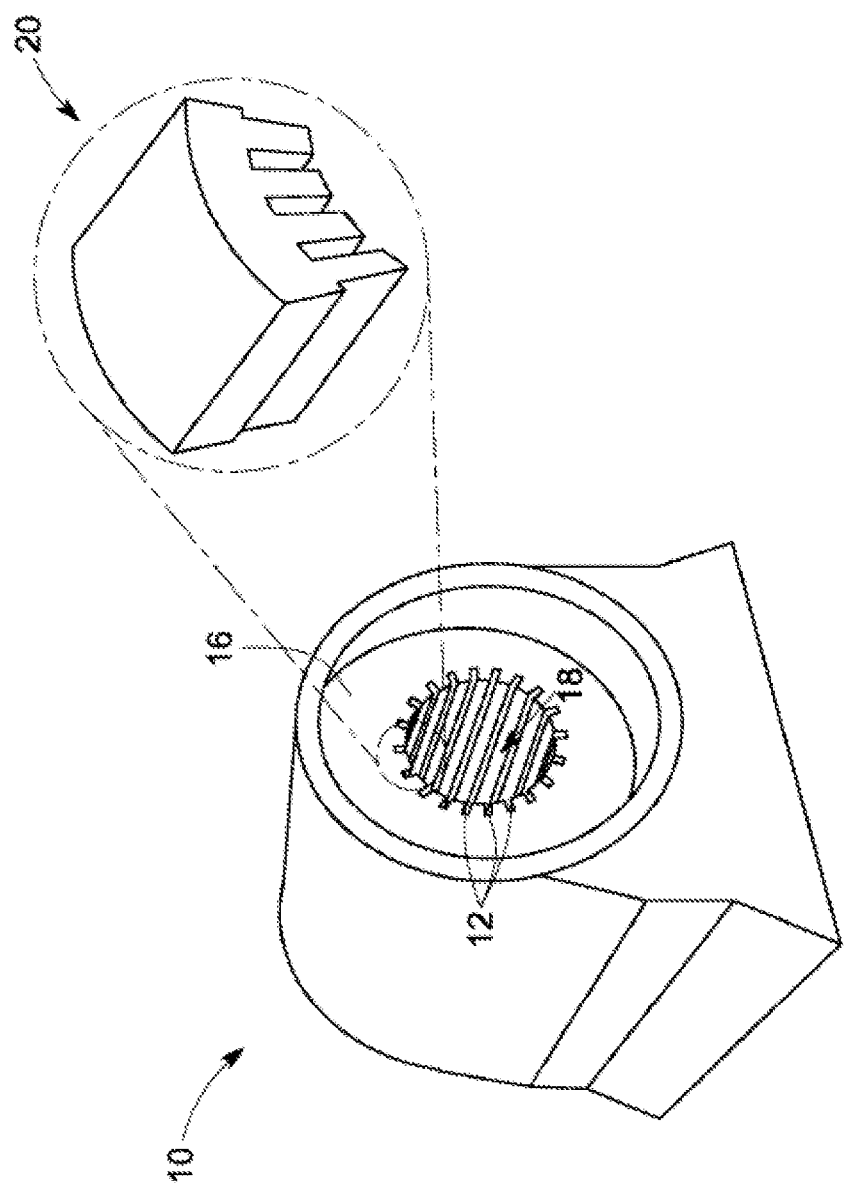
FIG. 1 is a perspective end illustration of an electric machine, according to an aspect of the present invention.

FIG. 1 is a perspective end view of an electric machine 10. The electrical machine 10 includes a core 16 having a plurality of stator slots 12 to accommodate a winding to generate a magnetic flux. The stator slots 12 are configured to accommodate stator windings to be positioned in the stator slots defined around an inner circumference of the core 16 (also referred to as the stator core). The stator bar windings may be formed from a plurality of flat bar conductors or stator bars that are coupled together to form a predetermined winding path. In one aspect of the invention, the stator bars are fabricated from copper. A rotor (not shown) may be disposed within the stator core 18 where an air or coolant gap is defined between the rotor and stator core 16. A partial, exploded view of the stator is illustrated by the reference numeral 20 that is described in detail with reference to FIG. 2. The electrical machine may be any electrical rotating machine or dynamo-electric machine, including but not limited to a motor or generator.

Figure 2:
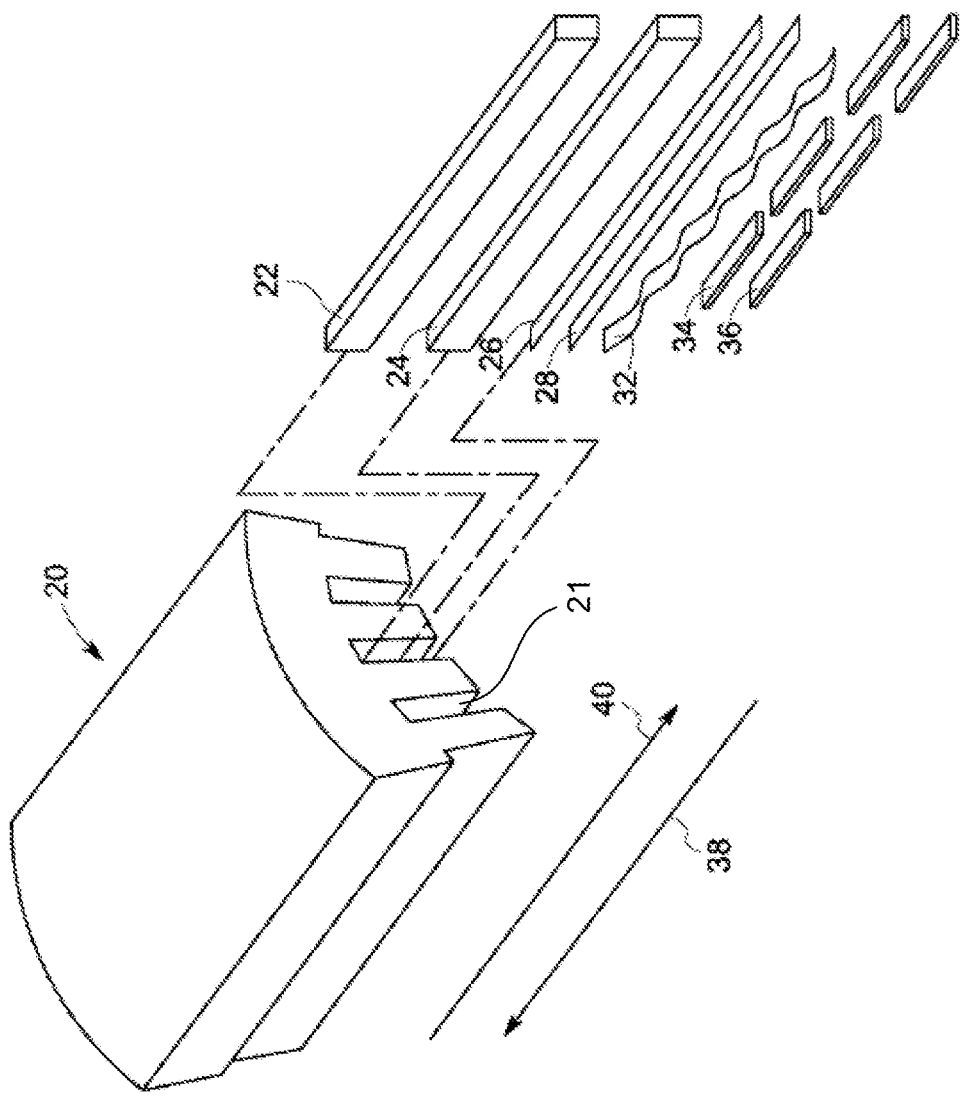
FIG. 2 is a partial exploded illustration of a portion of the electric machine stator shown in FIG. 1, according to an aspect of the present invention.

FIG. 2 illustrates a partial exploded view of a portion of the electric machine 10 of FIG. 1. In one aspect of the invention, the stator 20 includes a bottom stator bar winding 22, a top stator bar winding 24, and one or more slot fillers 26, 28 are positioned at least partially within each stator slot 21. The wedge or retaining system includes a retention device or ripple spring 32. In one aspect of the invention, the retention device includes a ripple spring 32 that is positioned at least partially within stator slot 21 such that the ripple spring 32 is adjacent at to at least one of slot filler 26 or slot filler 28. The ripple spring 32 is then secured in stator slot 21 using a plurality of stator wedge slides 34 and stator wedges 36. The ripple spring 32 may also be replaced with one of the ripple springs 400, 500, 600, 700, and 800 described in more detail hereinafter. For example, moving stator wedge slides 34 in a first direction, indicated by arrow 38, and with respect to stator wedges 36, or moving stator wedges 36 in a second direction, indicated by arrow 40, with respect to stator wedge slides 34, induces restraining pressure to outer stator bar 22 and inner stator bar 24 to facilitate securing outer stator bar 22 and inner stator bar 24 within stator slot 21.

Figure 3:
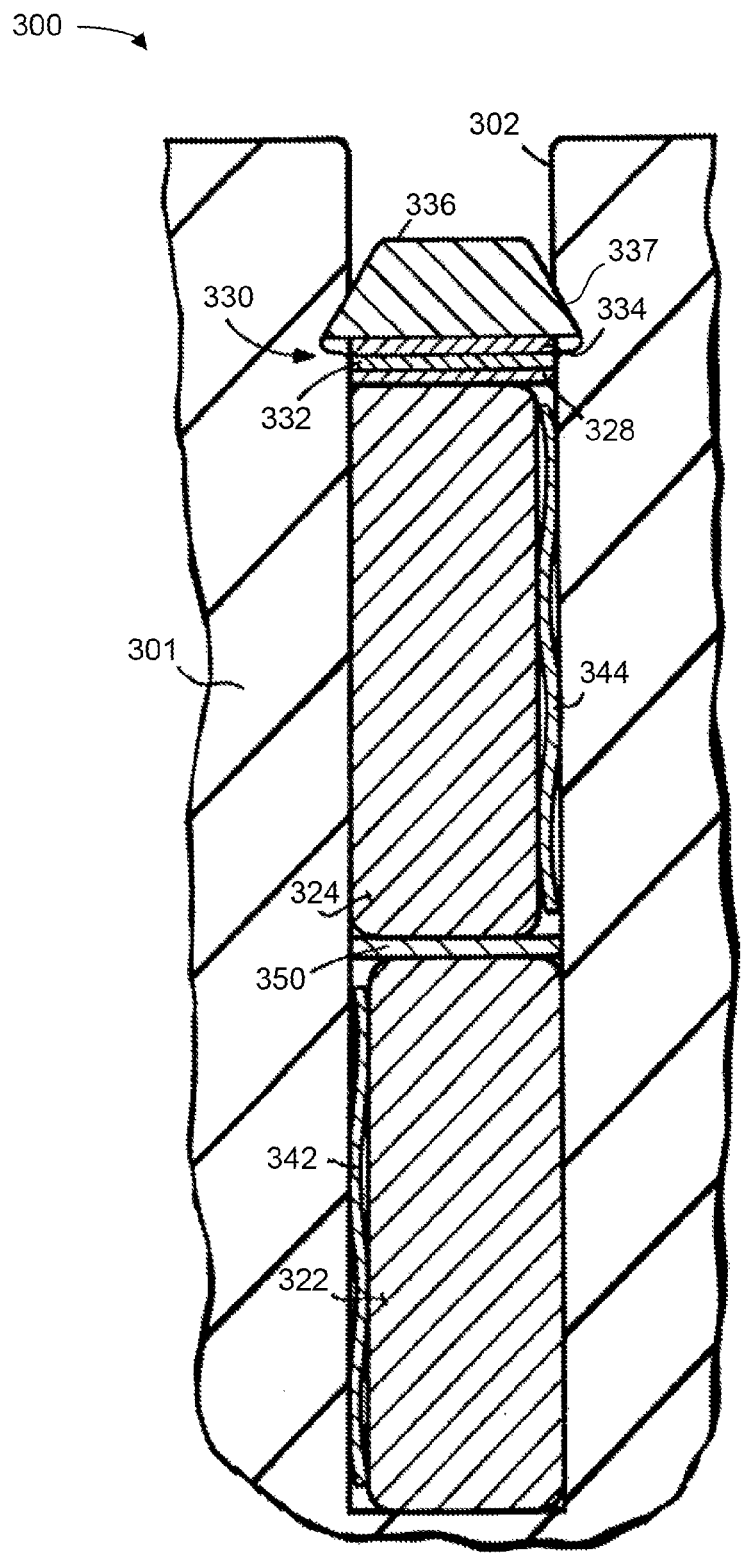
FIG. 3 is a partial cross-sectional illustration of a slot in a stator of an electric machine, according to an aspect of the present invention.

FIG. 3 illustrates a cross-sectional view of a stator slot according to another aspect of the invention. The stator 300 includes a stator core 301 and is part of a dynamoelectric machine or electric machine, such as a motor or a generator. The stator core 301 includes a plurality of radially extending stator slots 302 for housing windings or stator bars 322 and 324. As will be appreciated, the stator core 301 extends around a central axis and the stator slots 302, as well as the stator bars 322 and 324, extend longitudinally parallel to that axis and in a generally radially inward direction. In the illustrated form, side ripple springs 342 and 344 maintain the stator bars 322, 324 firmly against the opposite sides of the stator slot 302. The side ripple springs 342 and 344 may also be replaced with one of the ripple springs 400, 500, 600, 700, and 800 described in more detail hereinafter. Radial space in the stator slots 302 may be taken up by radial fillers 350. A top retention assembly 330 includes stator wedges 336 that extend longitudinally along a radially inner portion of the stator slots 302 with their lateral edges residing in shaped grooves or dovetails 337 formed in the stator slots 302, and a top ripple spring 332 positioned at least partially within stator slot 302 such that the ripple spring 332 is adjacent to at least one slot filler 328. The top ripple spring 332 is then secured in stator slot 302 using a plurality of stator wedge slides 334 and stator wedges 336. The top ripple spring 332 may also be replaced with one of the ripple springs 400, 500, 600, 700, and 800 described in more detail hereinafter.

Figure 4:
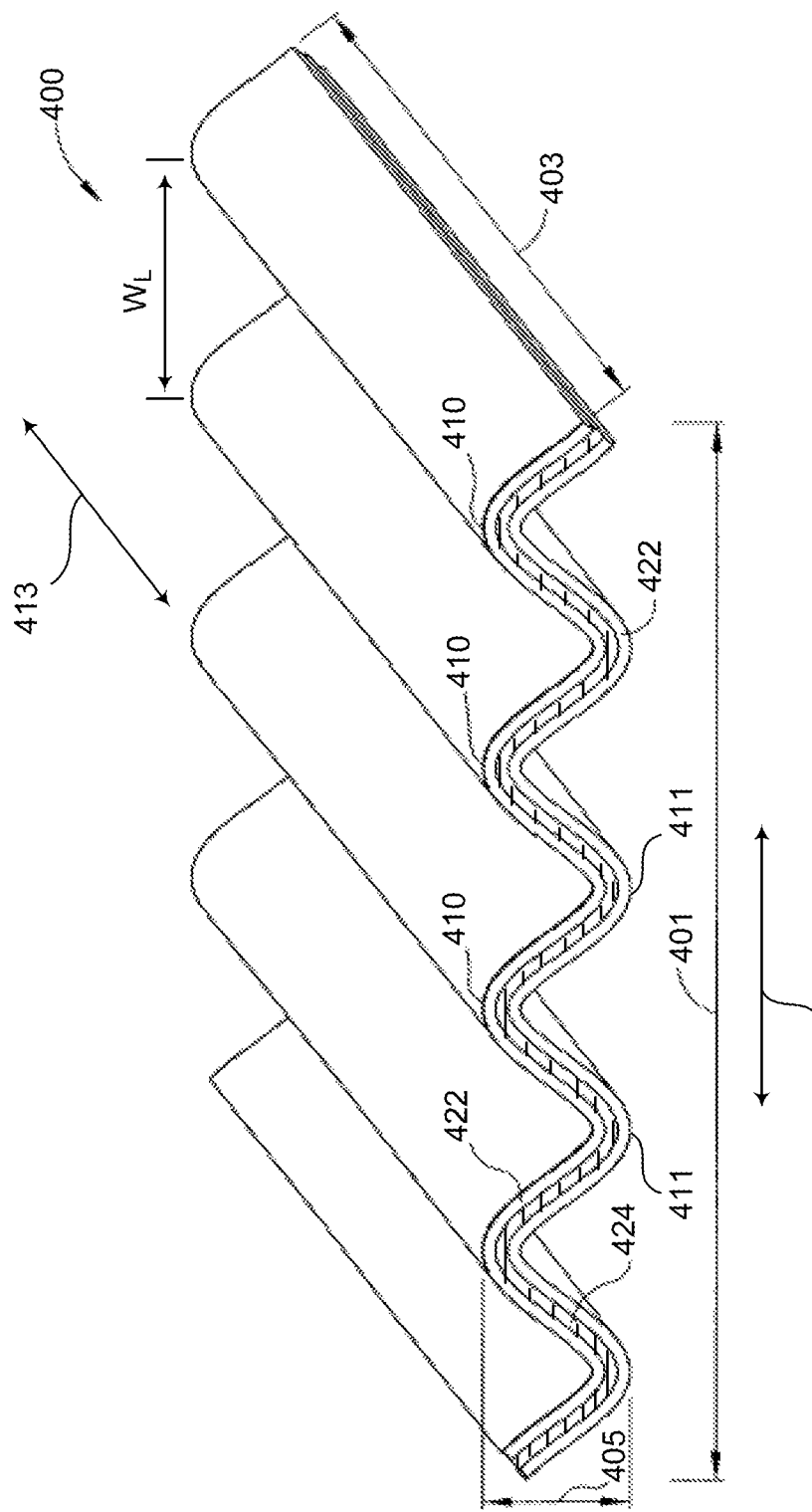
FIG. 4 is a perspective illustration of a ripple spring used within the stator slot of an electric machine, according to an aspect of the present invention.

FIG. 4 illustrates a perspective view of a ripple spring 400 according to an aspect of the present invention. The ripple spring 400 has a length 401 extending along a length axis 402, and a width 403 extending along an axis that is substantially orthogonal to the length axis. The ripple spring 400 also has a substantially sinusoidal surface or shape, and the sinusoidal surface has a wave cycle or wavelength $W_L$. The surface is comprised of a series of alternating peaks 410 and valleys 411, and the wavelength direction or axis may be generally parallel to the length axis 402. The valleys 411 extend along a valley axis 413, which may be substantially parallel to the width axis. However, it is to be understood that either the wavelength axis and/or valley axis could be oriented in any suitable direction, including but not limited to, parallel to the length axis, parallel to the width axis or any suitable angle therebetween.

The ripple spring 400 is comprised of a lamination or stack of one or more non-conductive layers 422 and one or more conductive or semi-conductive layers 424, where all the layers form a symmetrical stack or lamination. The non-conductive layers 422 may be comprised of multiple layers where at least one first layer is comprised substantially of unidirectional fibers oriented along a first axis, and at least one second layer is comprised substantially of unidirectional fibers oriented along a second axis, where the first axis is substantially orthogonal to the second axis. As one example only, the first layer may have fibers oriented along the length axis 402 and the second layer may have fibers oriented along the valley axis 413. The conductive layers 424 may comprise carbon fiber, graphite, copper, silver, gold and aluminum. The conductive layers 424 may be electrically and/or thermally conductive, as desired in the specific application.

Each layer of the ripple spring 400 may comprise glass fibers or carbon fibers. The glass fibers can be substantially unidirectional glass fibers, E-fiberglass (e.g., alumino-borosilicate glass), S-fiberglass (e.g., alumino silicate glass), fiberglass or any suitable fiber reinforced polymer made of a plastic matrix reinforced by fine fibers made of glass. The carbon fiber may be a woven fabric formed by many individual carbon fibers, or any other suitable carbon fiber material or composite.

In some prior known ripple springs having an asymmetrical stack of layers, cracks have developed along the valleys. The asymmetric configuration resulted in uneven internal spring forces that produced higher stress in the outer plys. The uneven internal spring forces were especially problematic in the plys or layers adjacent to layers oriented in the wavelength direction or axis. These cracks can eventually lead to failure of the ripple spring and subsequently to potential failure of the windings.

Accordingly, the ripple spring 400 is formed of one or more layers (or plys) that are laminated and then molded together to form a ripple spring having a symmetrical stack of layers with improved crack resistance and bending strength. The table below compares the approximate bending strength or force at rupture of a ripple spring having an asymmetrical stack of layers with the inventive ripple spring having a symmetrical stack of layers.

TABLE 1

|  | Bending Force at Rupture (lbf) | |
|  | SRS | TRS |
| --- | --- | --- |
| Asymmetric Ripple Spring | 27-38 | 110 |
| Symmetric Ripple Spring | 54 | 135-145 |
| Symmetric Ripple Spring with carbon fiber | 149 | 154 |

The asymmetric top ripple spring had a bending force at rupture of about 110 lbf (pound-force), and the inventive symmetric top ripple spring had a bending force at rupture of about 140 lbf, while the inventive symmetric top ripple spring with carbon fiber had a bending force at rupture of about 154 lbf. A ripple spring having a lower bending strength has a greater tendency to crack or malfunction during operation of the electric machine. Field experience has shown that the asymmetric ripple spring has cracked prematurely during service, and this led to unwanted machine shut downs as well as costly repairs. The symmetric ripple spring has increased strength and results in a significant and practical advantage by eliminating or at least greatly reducing the tendency to crack compared to the asymmetric ripple springs. In fact, by changing the order and orientation of each layer, a greater than expected result (i.e., improved bending force) was obtained in the symmetric ripple spring. The bending force can be further increased by the addition of carbon fiber layers.

Figure 5:
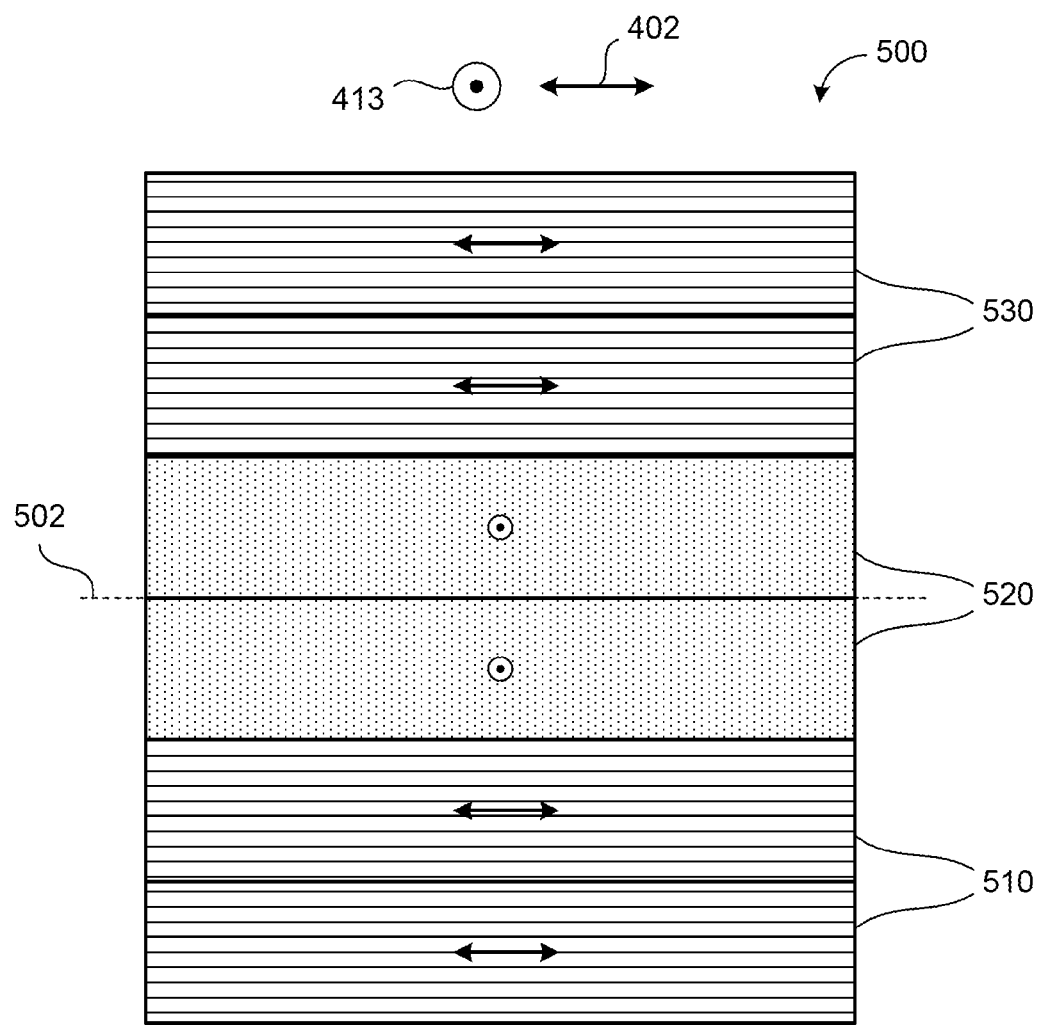
FIG. 5 is a cross-sectional illustration of a multi-layered ripple spring used within the stator slot of an electric machine, according to an aspect of the present invention.

FIG. 5 illustrates a cross-sectional view of a ripple spring 500 having a symmetrical stack of layers with improved bending force or strength. The ripple spring 500 can be formed of one or more bottom layers 510, one or more middle layers 520 and one or more top layers 530. In this configuration, the ripple spring is symmetrical about dashed line 502. Two of each layer is shown, but it is to be understood that one, two or three or more layers could be used for some or all of the various sections. The bottom layers 510 are formed of unidirectional glass fibers and the fibers are oriented substantially along the length axis or wavelength axis 402, which is shown going horizontally across the page. The middle layers 520 are also formed of unidirectional glass fibers and these fibers are oriented substantially along the valley axis 413, which is shown going into or out of the page. The top layers 530 are formed of unidirectional glass fibers and the fibers in the top layers are oriented substantially along the wavelength axis 402.

Each layer can be formed by impregnating unidirectional glass fabric with a binder material. Multiple layers can be formed into a laminate after drying or partial curing, and each laminate formed could have a thickness ranging from about 4 mil to about 8 mil. These laminates according to the symmetric design, can thus be molded together to form a uniform and symmetric ripple spring with desired wave cycles. As non-limiting examples only, the impregnating binder material may include epoxy, polyester, polyesterimide, polyamide-imide, epoxy-phenolic, epoxy-novolac resin, epoxy-polyimide, or combinations thereof, or any other suitable binder material whose thermal ratings are above the operating temperature of an electric machine. These impregnating resin binders can be filled with electrically and/or thermally conductive materials in order to enhance the dissipation of accumulated charges and heat on or within surfaces of insulated stator bars to the wall of steel-made slots.

Most cracks appear to form along the valley axis 413, so the ripple spring 500 should be more resistant to cracks by locating the crack oriented or valley oriented layers away from the surface of the ripple spring. The surface could be either the top or bottom surface, as both surfaces are in contact with portions of the electric machine or retention assembly. The ripple spring 500 is formed of a plurality of layers having alternating fiber orientations, and this alternating configuration is important for maintaining the strength of the ripple spring. For example, if all the layers were oriented in the same direction and if a crack formed it would rapidly spread along the entire ripple spring. By alternating the fiber orientations in a specific way and by configuring the layers in a symmetrical fashion, the strength of the ripple spring can be improved as well as its resistance to cracks and crack propagation. As one example, the symmetric top ripple spring 500 has a bending force at rupture of about 140 lbf.

Figure 6:
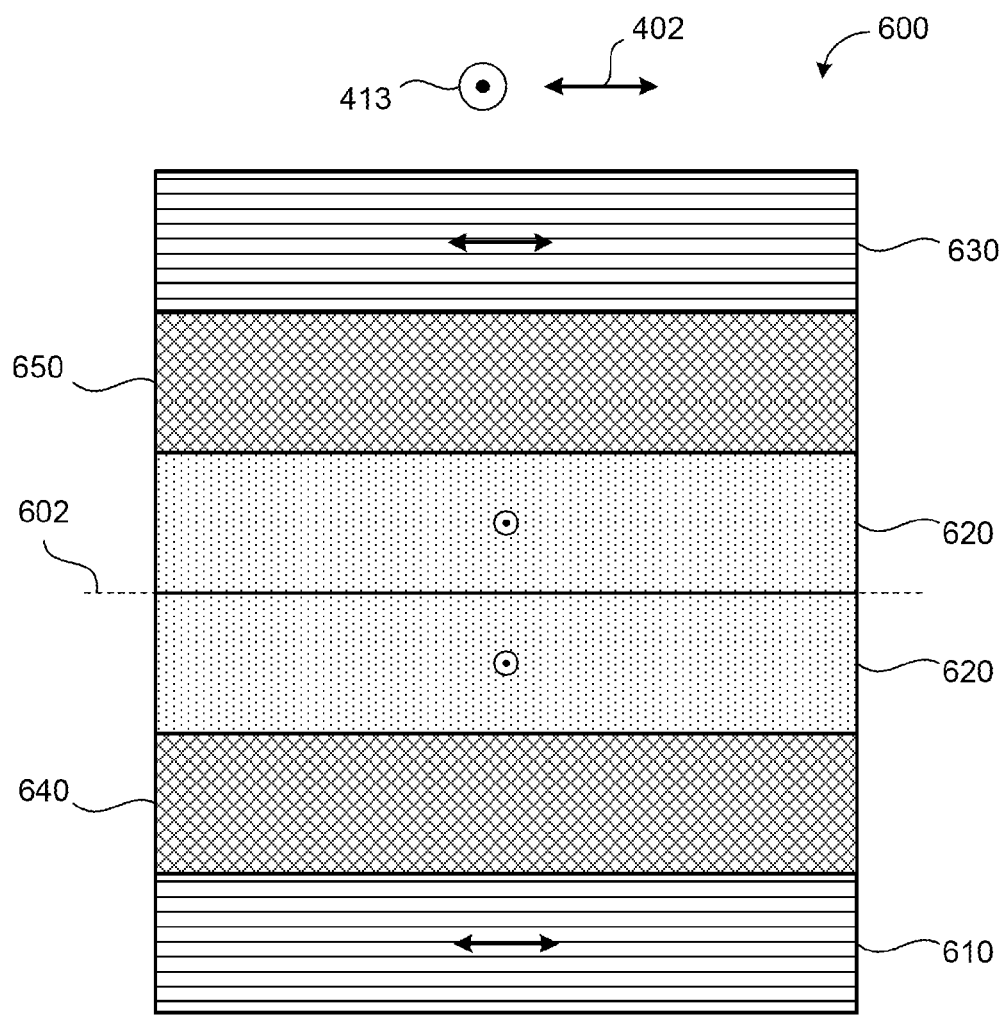
FIG. 6 is a cross-sectional illustration of a multi-layered ripple spring used within the stator slot of an electric machine, according to an aspect of the present invention.

FIG. 6 illustrates a cross-sectional view of a ripple spring 600 having a symmetrical stack of layers. The ripple spring 600 can be formed of one (as shown) or more bottom layers 610, one or more middle layers 620, one or more top layers 630, and conductive or semi-conductive layers 640, 650. However, it is to be understood that one, two or three or more layers could be used for each of the various sections. In this configuration, the ripple spring is symmetrical about dashed line 602. The bottom layer 610, middle layers 620 and top layer 630 are non-conductive layers that are formed of unidirectional glass fibers. The fibers in layers 610 and 630 are oriented substantially along the wavelength axis 402. The middle layers 620 are also formed of unidirectional glass fibers, but the fibers in these layers are oriented substantially along the valley axis 413. The first electrically and/or thermally conductive layer is located between the bottom layer 610 and the middle layer 620. The second electrically and/or thermally conductive layer 650 is located between the middle layer 620 and the top layer 630. The conductive layers 640, 650 may be formed of carbon fiber material. The carbon fiber material adds strength to the ripple spring 600. In addition, the carbon fiber material can be used to detect the condition or tightness of each ripple spring or the winding system in general. Each laminate layer can be molded to form a ripple spring with a time-temperature curing processing profile using binder material. The degree of cure may be controlled and monitored using the glass transition temperature of the binder material after molding and post-curing. As one example, this symmetric ripple spring 600 has a bending force at rupture of about 154 lbf.

Figure 7:
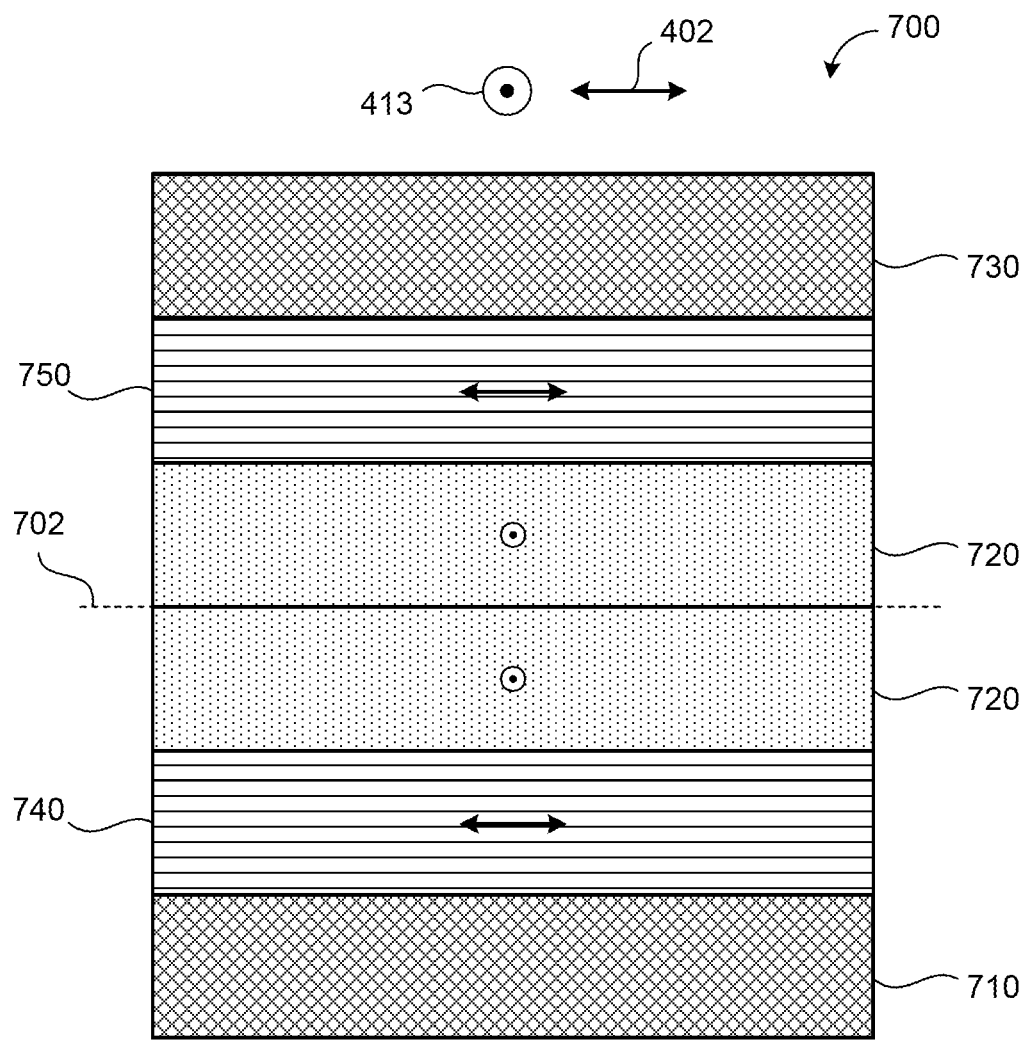
FIG. 7 is a cross-sectional illustration of a multi-layered ripple spring used within the stator slot of an electric machine, according to an aspect of the present invention.

FIG. 7 illustrates a cross-sectional view of a ripple spring 700 having a symmetrical stack of layers. The ripple spring 700 can be formed of one or more conductive or semi-conductive carbon fiber layers 710, 730, a non-conductive first layer 740, one or more non-conductive middle layers 720 and a non-conductive second layer 750. However, it is to be understood that one, two or three or more layers could be used for each of the various sections. In this configuration, the ripple spring is symmetrical about dashed line 702. The conductive bottom layer 710 and the conductive top layer 730 may be formed of carbon fiber material. The carbon fiber material adds strength to the ripple spring 700. The first layer 740 is located between the bottom conductive layer 710 and the middle layer 720, and the first layer 740 is formed of unidirectional glass fibers oriented substantially along the wavelength axis 402. The middle layers 720 are also formed of unidirectional glass fibers and these fibers are oriented substantially along the valley axis 413. The second layer 750 is located between the middle layer 720 and the top conductive layer 730, and the second layer 750 is formed of unidirectional glass fibers oriented substantially along the wavelength axis 402. Each layer can be bonded to adjacent layers with any suitable epoxy or binder material. Further, each laminate layer can be molded together to form ripple spring sheets from which a single ripple spring of any desired dimension can be cut.

Figure 8:
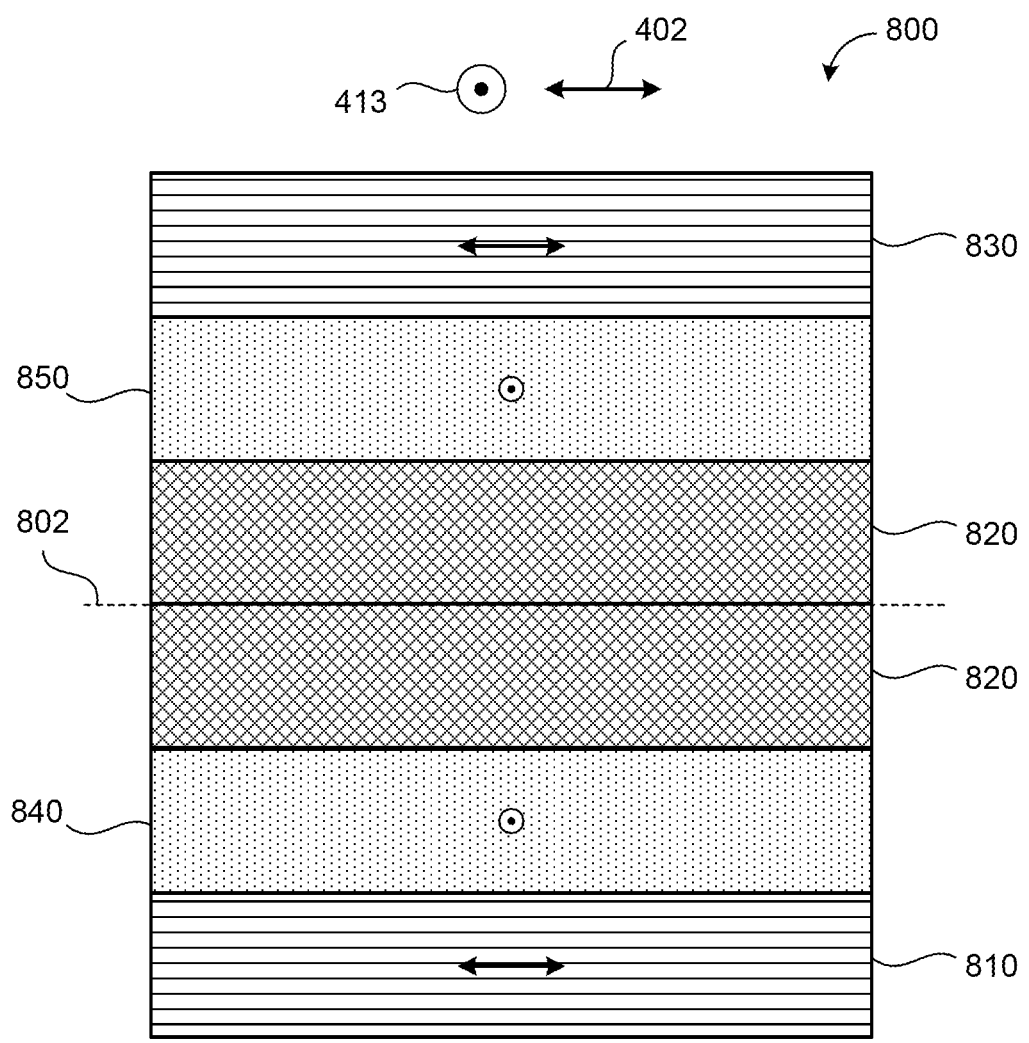
FIG. 8 is a cross-sectional illustration of a multi-layered ripple spring used within the stator slot of an electric machine, according to an aspect of the present invention.

FIG. 8 illustrates a cross-sectional view of a ripple spring 800 having a symmetrical stack of layers. The ripple spring 800 can be formed of one or more non-conductive bottom layers 810, a non-conductive first layer 840, one or more conductive or semi-conductive carbon fiber middle layers 820, a non-conductive second layer 850, and one or more non-conductive top layers 830. However, it is to be understood that one, two or three or more layers could be used for each of the various sections. In this configuration, the ripple spring is symmetrical about dashed line 802. The non-conductive bottom layer 810, non-conductive first layer 840, non-conductive second layer 850 and non-conductive top layer 830 may be formed of unidirectional glass fibers. The fibers in the bottom layer 810 and the top layer 830 are oriented substantially along the wavelength axis 402. The fibers in the first layer 840 and the second layer 850 are oriented substantially along the valley axis 413. The conductive middle layers 820 may be formed of carbon fiber material, and the carbon fiber material adds strength to the ripple spring 800. Each layer can be bonded to adjacent layers with any suitable epoxy or binder material.

During use, the ripple spring 400, is positioned at least partially within stator slot 21, and stator wedges 36 are then inserted into stator slot 21 to induce a compression force on the ripple spring 32 (shown in FIG. 2). More specifically, stator wedges 36 are repositioned to facilitate compressing the ripple spring 400 substantially flat, at which time a full radial retaining force is achieved. For example, when the ripple spring 400 is not compressed, i.e., the ripple spring 400 is relaxed, the undeflected height 405 of the ripple spring 400 may be between approximately 100 mil (2,540 microns or 0.1 inches) and 240 mil. However, when stator wedges 36 compress the ripple spring 400, the ripple spring is compressed to a thickness between approximately 40 mil to approximately 70 mil.

Accordingly, as the pressure on the ripple spring 400 is increased (or decreased) by repositioning wedges 36 within stator slot 21 and during an operation of the electrical machine 10, the thickness 405 of the ripple spring 400 changes across stator slot 21 in response to a vibration during operation or wedge pressure increase (or decrease). The ripple spring thickness 405, when either compressed or uncompressed, is both predictable and measurable via the conductive layer 424 configured to reflect and/or generate signals based on the mechanical boundary conditions that exists within the stator slot 21. A measuring instrument may be used to map a profile of the ripple spring 400. The measured profile is then used to determine the tightness of the stator winding within the stator slot 21 and/or the condition of the individual ripple springs 400.

According to one aspect of the present invention, at least one conductive or semiconductive layer 424 is embedded within or attached to the ripple spring. The conductive layer(s), which may include carbon fiber, is configured to generate signals related to at least one aspect of the winding and the spring. For example, the thickness or height of the ripple spring 400 can be used to indicate the tightness of the stator winding 22, 24.

Figure 9:
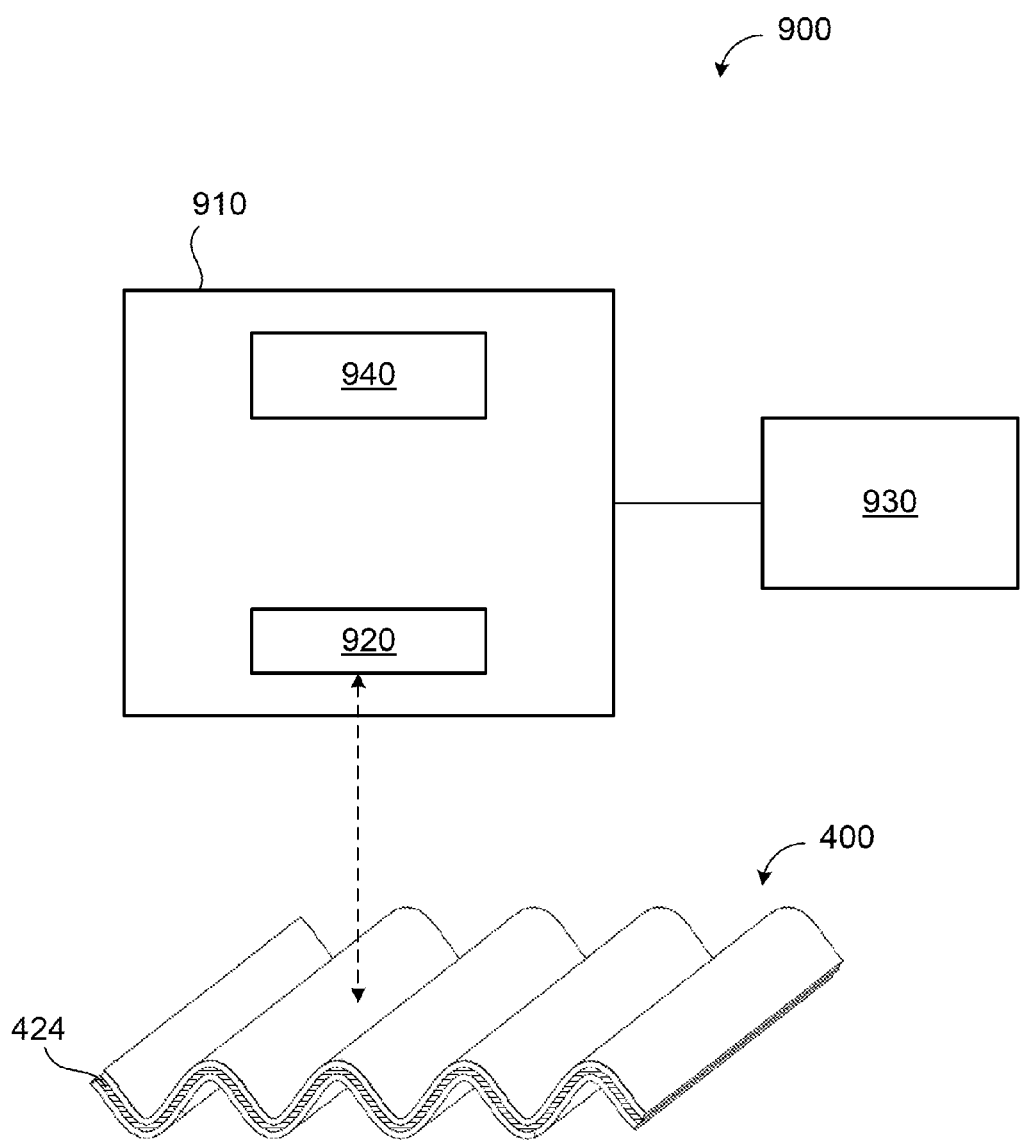
FIG. 9 is a simplified schematic illustration of a measuring system that is used to measure the stator winding tightness or ripple spring condition in an electric machine, according to an aspect of the present invention.

FIG. 9 is a measuring system 900 that can be used to measure the stator winding 22, 24 tightness and/or ripple spring 400 condition in an electromechanical device such as, but not limited to, electric machine 10 (shown in FIG. 1). Measuring system 900 includes a measuring apparatus 910. Measuring apparatus 910 comprises a transceiver or sensor 920 configured to detect a parameter in conjunction with conductive layer 424. As one example, the parameter may be capacitance. The measuring system 900 may also include a computer 930 configured to receive information from measuring apparatus 910 and to analyze data received from the transceiver 920. The transceiver 920 may be any suitable device for measuring capacitance or other desired parameter. In another aspect, measuring apparatus 910 includes a power source 940 configured to supply power to the measuring apparatus 910 and the transceiver 920. As used herein, the term computer is not limited to just those integrated circuits referred to in the art as computers, but broadly refers to computers, processors, microcontrollers, microcomputers, programmable logic controllers, application specific integrated circuits, and other programmable circuits.

The power source 940 may include an energy harvesting mechanism that may generate power from the surrounding magnetic flux or vibrations in the electrical machine. In operation, measuring system 900 is energized by the power source 940 such that energy is transmitted to the transceiver 920. The measuring apparatus 910 is configured such that the transceiver detects a signal in cooperation with conductive layer 424. The capacitance between the transceiver 920 and conductive layer 424 is inversely proportional to the separation distance between the two elements. The change in capacitance, as the transceiver travels along the slot 21, can be correlated to the individual "tightness" of each ripple spring and corresponding nearby wedges. A change in the capacitance may indicate a change or variation in the winding tightness or a malfunction or defect in a ripple spring.

In one aspect of the present invention, transfer functions that relate the capacitance to the thickness, height or relaxation measurement of the ripple spring 400 are used to determine the winding tightness and/or ripple spring condition in the electromechanical device 10. In case of any deviation from a predetermined value for the winding tightness, a fault signal may be generated. The fault signal may also be transmitted via any suitable communication means to a desired location. The ripple spring profile may also be mapped using measuring apparatus 910, or computer 930 coupled to measuring apparatus for example, to determine a thickness, height or relaxation of the ripple spring 400. Similarly, in the event of excessive relaxation or thickness are detected, a fault signal may be generated. Such a fault signal may be used to mitigate fault by way of a corrective measure such as shut down of the electrical machine 10. It may be noted that the fault signal helps in diagnostics and fault mitigation. A method implemented in the measuring system 900 is described in details of FIG. 10.

Figure 10:
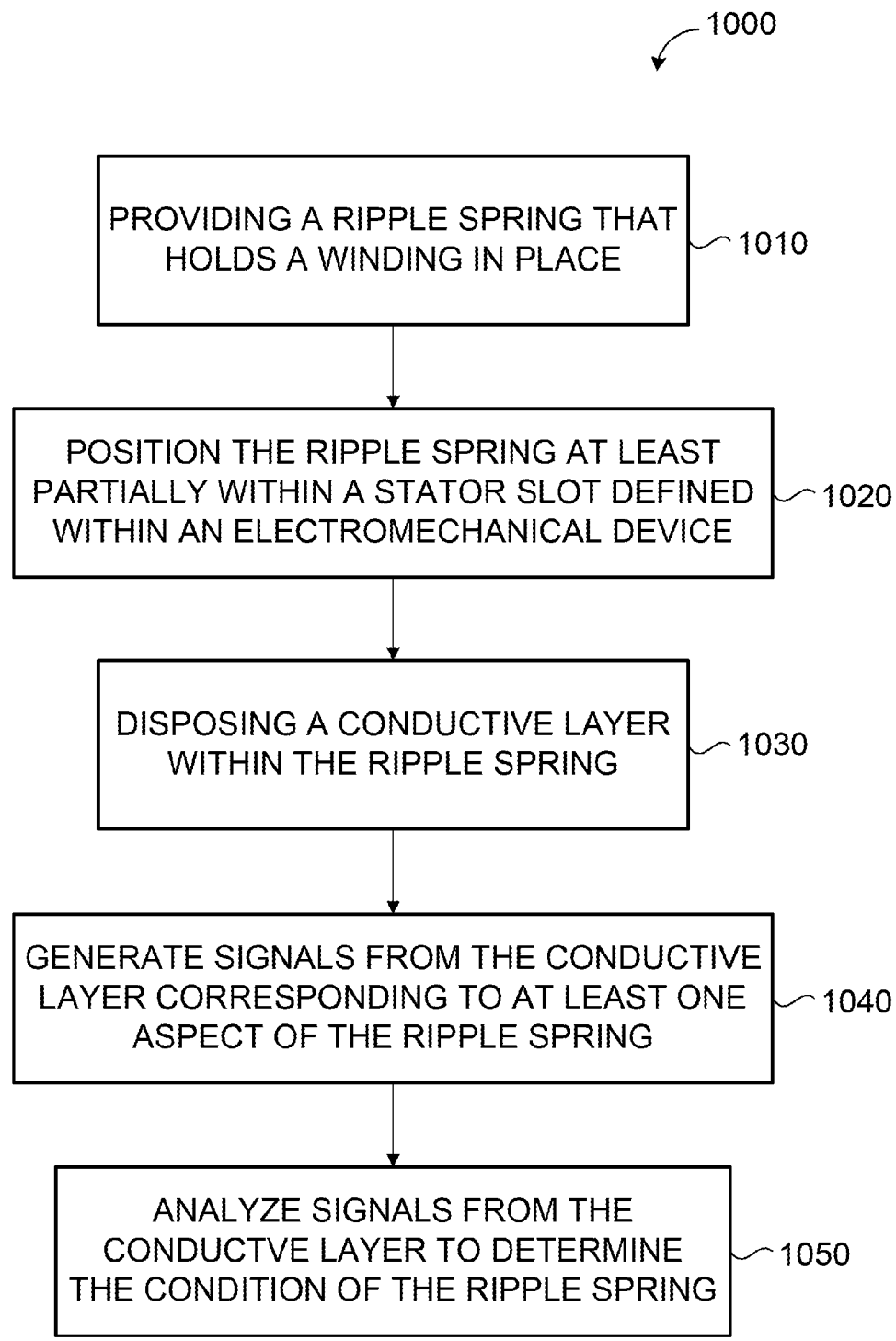
FIG. 10 is a simplified flowchart of a diagnostic method for determining the ripple spring condition in an electric machine, according to an aspect of the present invention.

FIG. 10 is a flow chart of a diagnostic method 1000 for monitoring winding tightness and/or the condition of the ripple springs, according to an aspect of the present invention. The method described herein assists an operator to easily inspect an electromechanical device (e.g., a generator, motor, etc.) winding system to determine the tightness of the winding system in the stator slot or the condition of the ripple springs. Specifically, the methods described herein facilitate measuring the tightness of the wedges accurately when the ripple spring system is used during operation of the electromechanical device.

The method 1000 includes providing a top or side ripple spring that holds a winding in place (1010). The ripple spring is positioned at least partially within a stator slot defined within the electromechanical device (1020). A conductive layer is provided or disposed within the ripple spring (1030). The conductive layer may be formed of one or combinations of carbon fiber, graphite, copper, silver, gold, aluminum, aluminum oxides and aluminum nitrides. Signals are generated from the conductive layer corresponding to at least one aspect of the ripple spring (1040). The signals from the conductive layer are analyzed to determine the at least or aspect or condition of the ripple spring (1050) that may help to mitigate or identify faults or defective ripple springs. For example, the signals may indicate the tightness of the ripple spring, or if the ripple spring is cracked.

Advantageously, the mapped profile of the ripple springs can then be used by an operator to determine if the wedges need tightening or if the ripple springs need replacement, or estimate when the wedges will require tightening in the future. The capacitive measurements proposed herein are relatively easy to measure requiring minimum electrical components resulting in a low cost system. The conductive layer 424 is integrated into the ripple springs that hold stator components in place. The electronics could be integrated into the ripple spring as well, or placed outside the generator at the human interface providing flexibility to the measuring and diagnostic system.

The ripple spring may be configured to be electrically and/or thermally conducting in side ripple spring applications whose surface resistivity may be about 15,000 to 750,000 ohms/square, and electrically insulating in top ripple spring applications. Electrically conducting or semiconducting side ripple springs may comprise the electrically securing element in closing the side slot in generators. In addition, the side ripple springs may include or be infused with conductive or semi-conductive material, such as but not limited to, graphite, metal, metal alloys, conductive or semiconductive fibers or conductive or semiconductive powders, conductive or semi-conductive polymers, conductive or semiconductive elastomers and conductive or semiconductive plastics whose thermal ratings or thermal classification is above the operating temperature of the electric machine. Electrically insulating top ripple springs may be preferred and electrically insulating materials may be used to form the top ripple springs. However, in some applications electrically conductive or semiconductive materials may be used in the fabrication of top ripple springs and in these applications the conductive or semiconductive material may be located near, or sandwiched in, the middle of the spring so as to reduce direct contact with adjacent surfaces.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A ripple spring comprising:
   one or more conductive layers;
   one or more non-conductive layers, the one or more non-conductive layers having at least one first layer comprised substantially of unidirectional fibers oriented along a first axis, and at least one second layer comprised substantially of unidirectional fibers oriented along a second axis, wherein the first axis is substantially orthogonal to the second axis; and
   wherein, the one or more conductive layers and the one or more non-conductive layers are laminated together to form a symmetrical stack of layers.

2. The ripple spring according to claim 1, the one or more conductive layers comprising at least one of:
   carbon fiber, graphite, copper, silver, gold and aluminum.

3. The ripple spring according to claim 1, the one or more non-conductive layers comprising at least one of:
   fiberglass, e-fiberglass, s-fiberglass, and fiber reinforced polymer.

4. The ripple spring of claim 1, wherein the one or more non-conductive layers comprise a binder material, the binder material comprising one or combinations of:
   epoxy, polyester, polyesterimide, polyamide-imide, epoxy-phenolic, epoxy-novolac resin, and epoxy-polyimide.

5. The ripple spring according to claim 1, the ripple spring having a length extending along the first axis and a width extending along the second axis, and a substantially sinusoidally shaped surface having a wavelength extending along the first axis.

6. The ripple spring according to claim 1, wherein a surface of the ripple spring comprises one or more peaks in series with one or more valleys, the one or more valleys having a valley axis substantially parallel to the second axis, wherein the ripple spring is configured so that:
   the at least one first layer is positioned substantially on an outer surface of the ripple spring, the outer surface comprising a top surface and/or a bottom surface of the ripple spring;
   the at least one second layer is positioned in the center of the ripple spring; and
   the one or more conductive layers are positioned between the at least one first layer and the at least one second layer.

7. The ripple spring according to claim 6, the one or more conductive layers comprising at least one of:
   carbon fiber, graphite, copper, silver, gold and aluminum.

8. The ripple spring of claim 6, wherein the one or more non-conductive layers comprise a binder material, the binder material comprising one or combinations of:
   epoxy, polyester, polyesterimide, polyamide-imide, epoxy-phenolic, epoxy-novolac resin, and epoxy-polyimide.

9. The ripple spring according to claim 1, wherein a surface of the ripple spring comprises one or more peaks in series with one or more valleys, the one or more valleys having a valley axis substantially parallel to the second axis, wherein the ripple spring is configured so that:
   the one or more conductive layers positioned substantially on an outer surface of the ripple spring, the outer surface comprising a top surface and/or a bottom surface of the ripple spring;
   the at least one second layer positioned in the center of the ripple spring; and
   the at least one first layer positioned between the one or more conductive layers and the at least one second layer.

10. The ripple spring according to claim 9, the one or more conductive layers comprising at least one of:
    carbon fiber, graphite, copper, silver, gold and aluminum.

11. The ripple spring of claim 9, wherein the one or more non-conductive layers comprise a binder material, the binder material comprising one or combinations of:
    epoxy, polyester, polyesterimide, polyamide-imide, epoxy-phenolic, epoxy-novolac resin, and epoxy-polyimide.

12. The ripple spring according to claim 1, wherein a surface of the ripple spring comprises one or more peaks in series with one or more valleys, the one or more valleys having a valley axis substantially parallel to the second axis, wherein the ripple spring is configured so that:
    the at least one first layer positioned substantially on an outer surface of the ripple spring, the outer surface comprising a top surface and/or a bottom surface of the ripple spring;
    the one or more conductive layers positioned in the center of the ripple spring; and
    the at least one second layer positioned between the at least one first layer and the one or more conductive layers.

13. The ripple spring according to claim 12, the one or more conductive layers comprising at least one of:
    carbon fiber, graphite, copper, silver, gold and aluminum.

14. The ripple spring of claim 12, wherein the one or more non-conductive layers comprise a binder material, the binder material comprising one or combinations of:
    epoxy, polyester, polyesterimide, polyamide-imide, epoxy-phenolic, epoxy-novolac resin, and epoxy-polyimide.

15. The ripple spring of claim 1, further in combination with:
    an electric machine having a rotor and a stator, the stator having a stator core with a plurality of stator slots;
    a plurality of stator bars contained substantially within the plurality of stator slots;
    wherein a top retention assembly comprises the ripple spring and secures the plurality of stator bars in the plurality of stator slots.

* * * * *